United States Patent Office 3,828,016
Patented Aug. 6, 1974

3,828,016
POLYMERIZATION OF VINYLPYRIDINE IN THE PRESENCE OF SMALL PARTICLES OF ZIEGLER CATALYZED POLYOLEFINS OR POLYSTYRENE
Robert Bacskai, Kensington, Calif., assignor to Chevron Research Company, San Francisco, Calif.
No Drawing. Filed Dec. 30, 1969, Ser. No. 889,304
Int. Cl. C08f 7/12, 15/02
U.S. Cl. 260—88.3 R       4 Claims

ABSTRACT OF THE DISCLOSURE

Vinylpyridine is polymerized in aqueous suspension in the presence of small solid particles of polyolefin.

BACKGROUND OF THE INVENTION

This invention relates to a novel process for polymerizing vinylpyridine. In particular, the invention is concerned with a process for the suspension polymerization of vinylpyridine catalyzed by a water-soluble free radical initiator in the presence of small particles of solid polyolefin.

Currently, polyvinylpyridine is blended with various isotactic polyolefins, e.g., polypropylene, to render the resulting mixture dye receptive. Blending is accomplished by mixing the solid polyolefin with the solid polyvinylpyridine and then extruding the mixture as a film or a filament. This process has the usual problems associated with solids mixing. Incomplete or poor mixing results in a dyed article having color streaks. Poorly mixed batches show streaks even after melting and extrusion. One problem in obtaining good mixing of these two solids is the difficulty in getting small-sized polyvinylpyridine particles.

Polyvinylpyridine is produced by the free radical catalyzed polymerization of either 2-vinylpyridine or 4-vinylpyridine or mixtures of the two. Both bulk and suspension processes have been used to effect this polymerization. The bulk polymerization process produces the usual solid mass of polymer which must be broken up and then further ground up in order to produce small-size particles for further handling. It is expensive to grind this polymer to a powder as fine as the polyolefin powder. Anything less results in poor mixing.

Surprisingly, the usual aqueous suspension polymerization of vinylpyridine also leads to large lumps of polymer. Although the monomer is completely dispersed, the polymer clumps up during polymerization. Sometimes the lumps are large enough to interfere with the agitator. These lumps also stick to the wall of the reaction vessel and are difficult to remove from the reactor. After separation from the aqueous medium, the lumps are difficult to dry. Even then, the lumps of polymer suffer the same disadvantage as bulk polymer; namely, they must be ground up into a powder in order to permit complete mixing with a polyolefin powder.

SUMMARY OF THE INVENTION

In the novel process according to the present invention the suspension polymerization of vinyl pyridine to produce small polymer particles is improved by carrying out the polymerization of vinylpyridine in aqueous suspension in the presence of small solid particles of polyolefin wherein the ratio of polyolefin particle:vinylpyridine is in the range of about 1.5:1 to about 100:1 and in the presence of a water-soluble free radical initiating catalyst.

Extremely small polyvinyl pyridine polymer particles which are substantially spheroidal in shape and have diameters ranging from 50 to 2,000 microns are obtained which are easily separated by filtration or centrifugation. The polyvinylpyridine product contains polyolefin powder embedded in the polymer particle and is particularly suitable as such for mixing with polyolefin, e.g., polypropylene, as a dye receptor.

Surprisingly, it has been found that when the charge ratio of polyolefin particle:vinylpyridine is below the 1.5:1 limitation there appears to be too much vinylpyridine in the system and the resulting polymeric product forms large unmanageable lumps.

DESCRIPTION OF THE PREFERRED EMBODIMENTS

The product of this new process is a small particle made up of two homopolymers, a polyolefin kernel or seed and a polyvinylpyridine coating. The solid particles formed in this way are spheroidal in shape and have diameters less than 2,000 microns and can therefore be easily and completely mixed with more solid polyolefin in the required ratios to give the desired amount of nitrogen in the finished product.

The small solid polyolefin particles, useful in this process, are obtained by the Ziegler catalyzed polymerization of low molecular weight olefins. The products of such polymerizations are characterized by a stereoregular arrangement of atoms in the polymer molecule. These polymers are called isotactic polymers. Because of the regular chemical structure, they are crystalline in nature and insoluble in the usual organic solvents. Useful polymers for the instant vinylpyridine polymerization process include polyethylene, polypropylene, poly-1-butene, and polystyrene. Isotactic polypropylene, insoluble in boiling heptane, is the preferred polymer for this process.

The solid poly-1-alkenes used in this invention are exemplified by polyethylene, polypropylene, poly-1-butene, poly-4-methyl-1-pentene, and the like. Such solid polymers will usually have molecular weights in excess of about 10,000. Frequently, they will be in the range of about 25,000 to 1,000,000. Polypropylene, which is insoluble in boiling heptane, and made using Ziegler-type catalysts, is preferred. Typically, Ziegler-type catalysts comprise an organo-aluminum compound such as a trihydrocarbyl aluminum or an an alkyl aluminum halide and the halide of a Group II to IV metal such as titanium trichloride, titanium tetrachloride, and vanadium oxychloride.

The polymers produced in a Ziegler catalyzed polymerization are readily obtained in a powder form by the usual polymerization and workup techniques. In the usual process, an olefin is added to heptane containing a Ziegler catalysts prepared by recating $TiCl_3$—$AlCl_3$ with a trialkyl aluminum compound. At the completion of the polymerization reaction, methanol is added and the small, powdery particles of the polymer are recovered by filtration and drying. Polymer particles obtained in this way are generally spherical in shape and have diameters ranging from 50–600 microns, i.e., particles are from 300–30 mesh (Tyler) in size. The preferred particles are from 100–250 microns in diameter, i.e., from 150–70 mesh in size.

The aqueous suspension polymerizations are carried out by rapidly stirring a mixture of insoluble polyolefin particles in water containing a water-soluble initiator. A surface active agent may optionally be added to facilitate suspending the polyolefin particles in the aqueous phase. Such surfactants include anionic detergents such as sodium dodecylbenzene sulfonate, sodium lauryl sulfate, etc., and nonionic detergents such as nonylphenoxytetraethoxy ethanol, etc. When the particles are in suspension, the vinylpyridine is added and polymerization is effected by activating the water-soluble initiator. This catalyst activation can be accomplished by heating at elevated temperatures up to 100° C., preferably about 70–90° C., or by adding a reducing agent at a temperature in the range of 0° C. to 70° C., preferably about 20–30° C. Reducing agents found to be effective activators for this reaction include ferrous sulfate, sodium bisulfite, and tertiary amines.

A surfactant may be added to the aqueous phase to enhance the coverage of the poly-1-alkene by the monomer. Only small amounts of surfactant, e.g., about 0.1–1% by weight of the poly-1-alkene, are necessary for this purpose. Anionic or nonionic surfactants may be used. Nonionics are preferred. Such surfactants are readily available to the art and are described and exemplified in *Surface Active Agents and Detergents*, Schwartz, Perry, and Berch, Vol. 2, Interscience (1958).

Polymerization is continued for a time sufficient to convert essentially all of the vinylpyridine monomer into polymer. This usually requires from 0.25–6 hours of reaction time. The quantity of water used in the emulsion polymerization of the present invention varies greatly. There must be at least sufficient water to permit separation of the individual polyolefin particles. The weight ratio of water to solid polyolefin necessary for this emulsion polymerization process ranges from 0.5:1 to 50:1, preferably from 2:1 to 10:1.

The polymerization reaction of the present invention is started by activating the water-soluble, free-radical initiator. This initiator must be water soluble. It was found that initiators soluble in vinylpyridine caused a graft polymerization of vinylpyridine onto the solid polyolefin particle (see copending application Ser. No. 617,029 filed Feb. 20, 1967, and now abandoned, which is a continuation-in-part of Ser. No. 335,680 filed Jan. 3, 1964 and now abandoned). Water-soluble initiators include peroxidic compounds such as hydrogen peroxide, the alkali metal persulfates, 0,0-t-butyl hydrogen monoperoxy succinate, and 4,4-bis(t-butylperoxy) valeric acid, and also azo compounds such as 4-t-butylazo-4-cyanovaleric acid. These initiators may be activated by heating. As is well known in free-radical art, each initiator has a preferred initiation temperature. The free-radical initiators are activated at temperatures in the range of 50–100° C., preferably 70–90° C. These same initiators may also be activated by adding a reducing agent to the system. These reducing agents include metal salts such as ferrous sulfate and sodium bisulfite; also included are the tertiary amines such as triethanol amine, dimethyl aniline, etc. Activators are used with the water-soluble initiators to effect polymerization at low temperatures in the range of 0–50° C., preferably 20–30° C.

The polymerization temperature will be such that the free radical catalyst decomposes at a reasonable rate. As indicated above, this temperature will usually be below about 90° C. In most instances, it will be in the range of about 25–90° C. Higher temperatures may be used, but their use requires that the reaction be done at superatmospheric pressure in order to maintain the liquid phase. At temperatures in the 25–90° C. range, the polymerization will not take more than about 6 hours. Total reaction time will normally be in the range of about 15 minutes to 2 hours.

The following examples are further illustrative of the process of preparing small particle polyvinylpyridine in accordance with this invention. Unless otherwise specified, the proportions in the illustrative examples are on a weight basis.

*Example 1*—Preparation of Poly-2-vinylpyridine a. A 500-ml., 3-necked, round-bottomed flask was charged with 100 ml. of distilled water containing 5 drops of nonylphenoxy tetraethoxy ethanol and 0.1 gram of potassium persulfate. Then 25 grams of commercial polypropylene powder having a melt flow rate of 3.5 and a particle size of 30 to 300 mesh and 9.8 grams of 2-vinylpyridine were added. The entire mixture was stirred rapidly and heated to 70° C. in a nitrogen atmosphere. Reaction was allowed to proceed at 70° C. for 1 hour. The reaction mixture was cooled and filtered to give, after drying, 33.2 grams of mixed polymer. This polymer was a freely flowing powder.

b. Example 1a was repeated using 50 grams of the same powdered polypropylene. In this case the polymer mixture weighed 52.1 grams and was also a freely flowing powder.

*Example 2*—Preparation of Poly-4-vinylpyridine a. Example 1a was repeated using 9.75 grams of 4-vinylpyridine in place of 2-vinylpyridine. The mixed polymer product weighed 29.25 grams and was a freely flowing powder.

b. Example 2a was repeated using 0.1 gram of ammonium persulfate and 50 grams of the same polypropylene powder. Analysis of the reaction system showed no unreacted vinylpyridine after 1 hour at 70° C.

*Example 3*—Attempted Preparation of Poly-4-vinyl-pyridine without Polyolefin

The reaction vessel was charged with 100 ml. of water, 1 gram of sodium lauryl sulfate, 20 ml. of 4-vinylpyridine, and 0.2 gram of benzoyl peroxide. This system was heated and stirred for 4 hours at 50° C. under a nitrogen atmosphere. The polymer coagulated and formed large clumps which stuck to the reactor walls and stirrer blade.

*Example 4*—Extraction of Polyvinylpyridine from Mixture of Polymers

Each product from Examples 1a, 1b, 2a, and 2b was extracted with boiling methanol using a Soxhlet apparatus. In each case the methanol insoluble portion weighed essentially the same as the polypropylene powder feed to the reaction. Each insoluble polymer was analyzed and found to have no nitrogen content. The methanol solvents were evaporated to dryness to give polyvinylpyridine.

*Example 5*—Polymerization of Vinylpyridine Using an Oil-Soluble Catalyst

In a reaction vessel was introduced 100 ml. of water containing 0.16 gram nonylphenoxy polyoxyethylene ethanol, 20 grams of polypropylene powder, and 5 ml. of 4-vinylpyridine in which was dissolved 0.05 gram of benzoyl peroxide. The mixture was stirred for 1 hour at 70° C. under a nitrogen atmosphere. At the end of this time, the powder was removed by filtration, extracted with boiling methanol, and weighed to give 22.45 grams of product. The product had 1.59% by weight of nitrogen representing 60.5% conversion of 4-vinylpyridine into a graft copolymer with the polypropylene. Its melting point was 163° C.

The product obtained by the new process according to this invention consists of a mixture of two homopolymers. It is ideally suited for blending with a polyolefin to effect dye capability. However, pure polyvinylpyridine may be recovered from the reaction product by extracting it with a suitable solvent. The preferred solvents are the low molecular weight alcohols, e.g., methanol, ethanol, and isopropanol. These solvents dissolve all of the polyvinylpyridine without dissolving any of the polyolefin kernel. The dissolved polymer is recovered in the usual way by evaporation of the solvent or by precipitation with water. The polyolefin particles can be recycled to the emulsion polymerization process.

While the character of this invention has been described in detail with numerous examples, this has been done by way of illustration only and without limitation of the invention. It will be apparent to those skilled in the art that modifications and variations of the illustrative example may be made in the practice of the invention within the scope of the following claims.

I claim:

1. In the suspension polymerization of vinylpyridine to produce small polymer particles of polyvinylpyridine of 50 to 2,000 microns diameter the improvement which comprises polymerizing vinylpyridine in aqueous suspension in the presence of small solid particles of Ziegler catalyzed polystyrene or polyolefin of low molecular weight olefins, said polyolefin being derived from 1-olefins having up to about 6 carbon atoms each, wherein the ratio of polystyrene or polyolefin particle:vinylpyridine is in the range of about 1.5:1 to about 100:1 the suspension polymerization being carried out in the presence of a water-soluble free radical initiating catalyst.

2. The process of Claim 1 in which the polyolefin is polypropylene.

3. The process of Claim 2 in which 0.1 to 1% by weight of nonionic surfactant on a basis of polyolefin is employed in the aqueous suspension.

4. The process of Claim 3 in which the small polymer particles are substantially spheroidal in shape.

References Cited
UNITED STATES PATENTS

| | | | |
|---|---|---|---|
| 3,752,868 | 8/1973 | Kahu et al. | 260—878 R |
| 3,483,274 | 12/1969 | Bacskai | 260—878 R |
| 3,493,480 | 2/1970 | Kuroda et al. | 260—878 R |

HARRY WONG, JR., Primary Examiner

U.S. Cl. X.R.

260—33.4 R, 878 R, 897 R